(12) United States Patent
Vu et al.

(10) Patent No.: US 10,315,397 B2
(45) Date of Patent: Jun. 11, 2019

(54) PHOTOCHROMIC POLYURETHANE LAMINATE

(71) Applicant: Vision Ease, LP, Ramsey, MN (US)

(72) Inventors: Hannah Vu, New Brighton, MN (US); Ping Fan, Ramsey, MN (US)

(73) Assignee: Vision Ease, LP, Ramsey, MN (US)

( * ) Notice: Subject to any disclaimer, the term of this patent is extended or adjusted under 35 U.S.C. 154(b) by 337 days.

(21) Appl. No.: 15/250,556

(22) Filed: Aug. 29, 2016

(65) Prior Publication Data

US 2016/0361906 A1 Dec. 15, 2016

Related U.S. Application Data

(62) Division of application No. 13/844,065, filed on Mar. 15, 2013, now Pat. No. 9,440,419.

(51) Int. Cl.
| | |
|---|---|
| *B32B 27/40* | (2006.01) |
| *B32B 27/08* | (2006.01) |
| *B32B 37/20* | (2006.01) |
| *C08G 18/66* | (2006.01) |
| *C08G 18/10* | (2006.01) |
| *C08G 18/42* | (2006.01) |
| *C08G 18/44* | (2006.01) |
| *G03C 1/73* | (2006.01) |

(52) U.S. Cl.
CPC ............ *B32B 27/40* (2013.01); *B32B 27/08* (2013.01); *B32B 37/206* (2013.01); *C08G 18/10* (2013.01); *C08G 18/4277* (2013.01); *C08G 18/44* (2013.01); *C08G 18/664* (2013.01); *G03C 1/733* (2013.01); *B32B 2250/24* (2013.01); *B32B 2255/10* (2013.01); *B32B 2255/26* (2013.01); *B32B 2307/40* (2013.01); *B32B 2307/4026* (2013.01); *B32B 2307/412* (2013.01); *B32B 2375/00* (2013.01); *B32B 2551/00* (2013.01); *Y10T 156/10* (2015.01); *Y10T 428/31551* (2015.04); *Y10T 428/31554* (2015.04)

(58) Field of Classification Search
CPC . B29L 2011/0016; B32B 27/40; C08G 18/10; C09J 5/02; C09J 174/04; C09J 2475/003
See application file for complete search history.

(56) References Cited

U.S. PATENT DOCUMENTS

| | | |
|---|---|---|
| 3,284,539 A | 11/1966 | McElroy |
| 3,806,462 A | 4/1974 | Bloom |
| 3,939,222 A | 2/1976 | Dieterich |
| 3,989,676 A | 11/1976 | Gerkin et al. |
| 4,160,853 A | 7/1979 | Ammons |
| 4,268,134 A | 5/1981 | Gulate et al. |
| 4,590,144 A | 5/1986 | Schornick et al. |
| 4,756,973 A | 7/1988 | Sakagami et al. |
| 4,856,857 A | 8/1989 | Takeuchi et al. |
| 4,889,413 A | 12/1989 | Ormsby et al. |
| 5,175,201 A | 12/1992 | Forgione et al. |

(Continued)

FOREIGN PATENT DOCUMENTS

| | | |
|---|---|---|
| AU | 2004270746 B2 | 3/2005 |
| EP | 1 673 655 B1 | 6/2015 |
| WO | WO 2014/144839 A1 | 9/2014 |

*Primary Examiner* — Timothy Kennedy
(74) *Attorney, Agent, or Firm* — Inskeep IP Group, Inc.

(57) ABSTRACT

Photochromic polyurethane laminates and methods for the formation of same wherein a photochromic polyurethane layer of the laminate is interposed between two primer coated transparent resin sheets.

17 Claims, 2 Drawing Sheets

(56) References Cited

U.S. PATENT DOCUMENTS

| | | |
|---|---|---|
| 5,489,359 A | 2/1996 | Yamane |
| 5,578,142 A | 11/1996 | Hattori |
| 6,068,797 A | 5/2000 | Hunt |
| 6,187,444 B1 | 2/2001 | Bowles et al. |
| 6,258,310 B1 | 7/2001 | Sardanopoli et al. |
| 6,264,782 B1 | 7/2001 | Oshima et al. |
| 6,287,698 B1 | 9/2001 | Zhu et al. |
| 6,353,078 B1 | 3/2002 | Murata et al. |
| 6,367,930 B1 | 4/2002 | Santelices et al. |
| 6,391,231 B1 | 5/2002 | Evans et al. |
| 6,797,383 B2 | 9/2004 | Nishizawa et al. |
| 7,025,458 B2 | 4/2006 | Vu |
| 7,077,985 B2 | 7/2006 | Maki et al. |
| 7,465,414 B2 | 12/2008 | Knox et al. |
| 8,298,671 B2 | 10/2012 | Qin et al. |
| 8,367,211 B2 | 2/2013 | Qin et al. |
| 8,906,183 B2 | 12/2014 | Qin et al. |
| 9,081,130 B1 | 7/2015 | Fan et al. |
| 9,163,108 B2 | 10/2015 | Vu et al. |
| 2001/0009721 A1 | 7/2001 | Kawashima |
| 2002/0009599 A1 | 1/2002 | Welch |
| 2002/0197484 A1 | 12/2002 | Nishizawa et al. |
| 2004/0126587 A1 | 7/2004 | Maki et al. |
| 2004/0156086 A1 | 8/2004 | Nishizawa et al. |
| 2004/0180211 A1 | 9/2004 | Moravec et al. |
| 2004/0207809 A1 | 10/2004 | Blackburn et al. |
| 2005/0233153 A1 | 10/2005 | Qin et al. |
| 2006/0269741 A1 | 11/2006 | Izumi et al. |
| 2009/0312515 A1 | 12/2009 | Uchida et al. |
| 2010/0124631 A1 | 5/2010 | Horio et al. |
| 2011/0070432 A1 | 3/2011 | Qin et al. |
| 2012/0135241 A1 | 5/2012 | Yesuda et al. |
| 2013/0004775 A1 | 1/2013 | Vu et al. |
| 2013/0127079 A1 | 5/2013 | Qin et al. |
| 2014/0005304 A1 | 1/2014 | Suresh et al. |

Fig. 1

| Examples | Comparative Laminate Example 9 | Laminate Example 11 | Laminate Example 12 | Laminate Example 13 | Comparative Laminate Example 14 |
|---|---|---|---|---|---|
| Room Temp. T-Peel Strength (Initial) (kg/in) | 4.28 | 7.18 | 7.47 | 7.7 | 6.5 |
| Room Temp. T-Peel Strength (After Heat Treatment) (kg/in | 4.57 | 5.45 | 6.59 | 8.03 | 6.08 |
| High Temperature T-Peel Strength (Initial) (mm) | 1347 | 21.67 | 37.58 | 0 | 0 |
| High Temperature T-Peel Strength (After Heat Treatment) (mm) | 2423 | 127 | 158 | 8 | 12 |
| Accelerated Weathering Test (Hrs) | 484 | 1693 | 1401 | 311 | 191 |

*No separation occurred because transparent resin sheet broke prior to separation of laminate layers.

PHOTOCHROMIC POLYURETHANE LAMINATE

RELATED APPLICATIONS

This application is a divisional of and claims priority to U.S. patent application Ser. No. 13/844,065 filed Mar. 15, 2013 entitled Photochromic Polyurethane Laminate; which is hereby incorporated herein by reference in its entirety.

FIELD OF THE INVENTION

The present invention relates generally to a photochromic laminate and methods of producing the same. More particularly, the present invention relates to photochromic laminates employing photochromic polyurethanes laminates having primer coated base layers.

BACKGROUND OF THE INVENTION

Photochromic articles, particularly photochromic plastic materials for optical applications, have been the subject of considerable attention. In particular, photochromic ophthalmic organic glass lenses (e.g., injection molded polycarbonate lenses or CR39 cast lenses) have been commercially desirable because of the weight advantage and impact resistance they offer over glass lenses. Moreover, photochromic transparencies, e.g., photochromic window panes for vehicles such as cars, boats and airplanes, have been of interest because of the potential safety features that such transparencies offer.

The use of polycarbonate ophthalmic lenses, particularly in the United States, is widespread. The demand for sunglasses that are impact resistant has increased as a result of extensive outdoor activity. Materials such as polycarbonate, however, have not historically been considered optimal ophthalmic sunglass lenses with photochromic dyes due to slow activation rates, slow fading (bleaching) rates, and low activation intensities.

Nonetheless, there are several existing methods to incorporate photochromic properties into lenses made from materials such as polycarbonate. One method involves applying to the surface of a lens a coating containing dissolved photochromic compounds. For example, Japanese Patent Application 3-269507 discloses applying a thermoset polyurethane coating containing dissolved photochromic compounds on the surface of a lens. U.S. Pat. No. 6,150,430 similarly discloses a photochromic polyurethane coating for lenses. The content of each of these prior art references is incorporated herein by reference.

Another method involves coating a lens with an imbibing process. A process described in U.K. Pat. No. 2,174,711 or U.S. Pat. No. 4,968,454, both of which are incorporated herein by reference, is used to imbibe a solution containing photochromic compounds into the base coating material. The most commonly used base material is polyurethane.

The two methods described above, which involve coating or imbibing the lens after it is molded, however, have significant shortcomings. For example, typically a coating of about 25 µm or more is needed in order for a sufficient quantity of photochromic compounds to become incorporated into the base of the lens and thereby provide the desired light blocking quality when the compounds are activated. This relatively thick coating is not suited for application on the surface of a segmented, multi-focal lens because an unacceptable segment line and coating thickness nonuniformity around the segment line are produced. The desired surface smoothness is also negatively affected.

Turning to lenses made from injection molded techniques, lenses made of plastic materials such as polycarbonate can be produced by an injection molding process that uses an insert placed in the mold prior to the injection of the molten plastic material (insert-injection molding). The insert can be the means by which photochromic properties are incorporated into the lenses. Insert injection molding is a process whereby the molten plastic resin is injection molded onto an insert having, e.g., a photochromic property, that has been placed in the mold cavity. An example of this process is disclosed in commonly assigned U.S. Pat. No. 6,328,446, which is herein incorporated by reference in its entirety, whereby a photochromic laminate is first placed inside a mold cavity. Molten polycarbonate lens material is next injected into the cavity and fused to the back of the photochromic laminate. This procedure produces a photochromic polycarbonate lens. Because the photochromic function is provided by a thin photochromic layer in the laminate, it is possible to then finish-grind the photochromic polycarbonate lenses with any kind of surface curvature without damaging or degrading the photochromic properties of the lens.

Photochromic lenses can also be made by the cast process as described in U.S. Patent Publication 2007/0122626, the entire contents of which is incorporated by reference. The cast molding process includes placing the photochromic film in a cast mold, then introducing the cast monomer into the mold and then curing the monomer in the mold into lenses either by heat or by radiation.

Resin laminates with photochromic properties that could be considered for use in the above mentioned insert-injection molding technique or the cast molding process have been disclosed in many patents and publications. Examples include Japanese Patent Applications 61-276882, 63-178193, 4-358145, and 9-001716; U.S. Pat. No. 4,889,413; U.S. Patent Publication No. 2002-0197484; and WO 02/093235 (each of which is herein incorporated by reference). The most commonly used structure is a photochromic polyurethane host layer bonded between two transparent resin sheets. Although the use of polyurethane as a photochromic host material is well known, photochromic polyurethane laminates designed especially for making photochromic polycarbonate lenses through, for example, the insert-injection molding method are unique.

Problems associated with conventional insert injection molding techniques in the manufacture of photochromic lenses using prior art photochromic polyurethane laminates include polyurethane bleeding and poor replication of lens segment lines. "Bleeding" occurs from the deformation of the polyurethane layer during injection molding processing. In particular, bleeding occurs when the polyurethane layer melts and escapes from its position between the two transparent sheets of the laminate during the high temperature and high pressure injection molding process. Bleeding most frequently results, in part, from an excess amount of polyurethane and from using too soft a polyurethane material. Poor replication of segment lines occurs when the layer of polyurethane is too thick and movement of the laminate occurs as pressure from the mold is applied.

In attempts to address at least the bleeding problem, it is preferred to have the polyurethane cross-linked thus making a harder and high temperature resistant polyurethane material. However, cross-linked polyurethane, once made, is difficult to laminate between transparent resin sheets and arrive at a suitable photochromic laminate. For example, a cross-linked polyurethane, once made, is not soluble in a solvent and thus cannot be laminated between transparent resin sheets using a casting method. A cross-linked polyurethane also neither melts nor softens at temperature ranges necessary for making a laminate with transparent resin sheets through the extrusion process. One method that has been considered for incorporating cross-linked polyurethane into a laminate is to start with a liquid polyurethane system such as the one described in U.S. Patent Publication No. 2002/0197484, which is herein incorporated by reference. To make the laminate efficiently, a web coat-laminate line such as the one described in Japan Patent Laid Open 2002-196103, which is herein incorporated by reference, might be used. The coating equipment is capable of coating a uniform layer of liquid polyurethane mixture.

However, this layer will only be partially solidified (or cured) at the moment of in-line lamination. Consequently, any surface defects in the resin sheet and/or the lamination rollers are easily transferred to the soft polyurethane layer during lamination. The most often seen defects in the polyurethane layer include thickness un-evenness across the web and thin spots due to uneven pressure at lamination or improper handling. In order to have the polyurethane layer firm enough to withstand the necessary pressure during lamination and avoid these defects, it needs to first be cured for a certain amount of time. Curing, however, slows down the processing or renders the web coating-laminating approach impossible.

The concepts disclosed in U.S. Patent Publication No. 2005/0233153 (the "'153 Publication"), the entire contents of which are herein incorporated by reference, attempt to address at least some of the problems and shortcomings associated with existing polyurethane laminates. However, the need exists to further address the problems described above, even beyond the teachings of the '153 Publication.

For example, another significant shortcoming of lenses formed of photochromic laminates is the delamination induced by extreme conditions such as high stress level generated from frames; extreme environmental conditions such as high temperature and humidity; chemical attack or degradation from chemical agents such as cleaning agents; and a wearers' skin oil and sweat. Delamination can also be induced through the migration of small molecules, e.g. dyes and additives, from the bulk of polyurethane layer to the interface between resin sheets and polyurethane layers. Such migration can result in weakened bonding strength of the laminates and premature delamination of the lenses.

OBJECTS AND SUMMARY OF THE INVENTION

In view of the above, a need exists to overcome the problems and shortcomings associated with existing polyurethane laminates having photochromic properties and methods of making such laminates.

For example, the present application discloses the concept of introducing a network structure into the molecular make up of a photochromic polyurethane layer by adding a crosslinking agent having three or more functional groups into the formulation. Said functional groups are preferably either active hydroxyl groups or NCO groups. This creates a network structure by the occurrence of a crosslinking reaction during the curing stage of the polyurethane thereby improving the properties of the layer.

The present application further discloses the concept of introducing an enhanced network structure of the photochromic polyurethane laminate with improved adhesion to the resin sheet and introducing a barrier layer to prevent small molecule migration by employing polyurethane primers.

Photochromic polyurethane laminates according to the present invention can be applied to polymeric surfaces or can be used independently as a photochromic element. Photochromic polyurethane laminates according to the present invention are capable of withstanding high temperatures and can be incorporated into plastic lenses by means of injection molding or casting. The present invention further relates to a photochromic laminate that is excellent in both control of thickness and surface smoothness of the photochromic layer, and thereby exhibits uniform darkness in the activated state.

Some of the resulting improved properties include increased mechanical strength, improved chemical resistance, improved adhesion of the polyurethane layer to the first and second transparent resin sheet; improved cohesion within the photochromic polyurethane layer; improved heat resistance of the laminate, improved humidity resistance of the laminate, improved bleeding resistance of the laminate during the molding process; and improved control of thickness and surface smoothness of the photochromic layer. Hence, photochromic polyurethane laminates according to the present invention exhibit enhanced uniform darkness in the activated state.

BRIEF DESCRIPTION OF THE DRAWINGS

These and other aspects, features and advantages of which embodiments of the invention are capable of will be apparent and elucidated from the following description of embodiments of the present invention, reference being made to the accompanying figures, in which:

FIG. 1 is a table setting forth physical properties of the various examples of laminates according to certain embodiments of the present invention.

DESCRIPTION OF EMBODIMENTS

Figure 2:
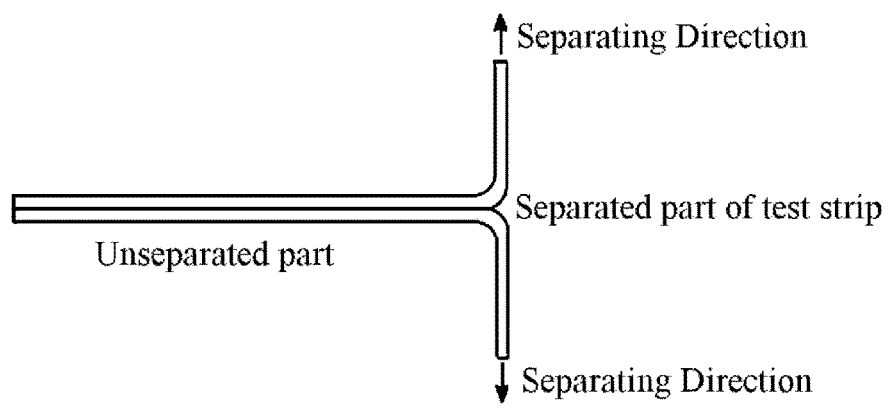
FIG. 2 is a schematic description of a test configuration for measuring characteristics of laminates according to certain embodiments of the present invention.

Specific embodiments of the invention will now be described with reference to the accompanying figures. This invention may, however, be embodied in many different forms and should not be construed as limited to the embodiments set forth herein; rather, these embodiments are provided so that this disclosure will be thorough and complete, and will fully convey the scope of the invention to those skilled in the art.

One embodiment of the present invention includes a photochromic polyurethane laminate that has a first resin layer coated with a primer, a second resin layer coated with a primer, and a polyurethane layer having photochromic properties. The polyurethane layer is interposed between the first and second primer coated layers.

The polyurethane layer is formulated from a polyurethane that has been crosslinked with an isocyanate-active prepolymer via a crosslinking agent. In certain embodiments, the crosslinking agent is a molecule having at least three functional groups that are reactive with either a functional group of the polyurethane or a functional group of the isocyanate-active prepolymer. In other words, the at least three functional groups are reactive with a functional group of at least one of the polyurethane and isocyanate-active prepolymers. A crosslinked photochromic polyurethane laminate of this type leads to a laminate that has improved mechanical and material properties thus providing a laminate that is more versatile and robust for use in manufacturing photochromic articles such as injection molded photochromic lenses and/or cast photochromic lenses.

In one embodiment the crosslinking agent is a multifunctional alcohol where at least three functional groups react with the isocyanate groups of the isocyanate prepolymer. In another preferred embodiment, the crosslinking agent is a multifunctional isocyanate, isocyanate oligomer, or isocyanate prepolymer where the functional groups react with the hydroxyl groups of the polyurethane.

In certain embodiments, the polyurethane is formed of a composition including one or more polycarbonate polyols having the Formula I:

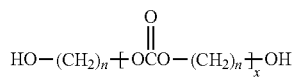

Wherein "n" is equal to an integer from 3 to 6 or a combination thereof and "x" is an integer that makes the molecular weight of the polyols approximately equal to 500 to 2500 Daltons.

In another embodiment, the polyurethane is formed of a composition including one or more polyether polyols having the Formula II:

Wherein "$R_1$" and "$R_2$" are hydrogen or an alkyl group, and "M" is equal to $(CH_2)_y$; wherein "y" is an integer from 1 to 6, and "x" is an integer that makes the molecular weight of the polyether polyols approximately equal to 500 to 2500 Daltons.

In another embodiment, the polyurethane is formed of a composition including one or more polyester polyols having the Formula III:

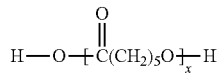

Wherein "x" is an integer that makes the molecular weight of the polyester polyols approximately equal to 500 to 2500 Daltons.

In another embodiment, the polyurethane is formed of a composition including one or more polycarbonate polyols, as described in Formula I above, and an aliphatic or cycloaliphatic diisocyanate and a chain extender. The aliphatic diisocyanate may, for example, be hexamethylene diisocyanate. The cycloaliphatic diisocyanate may, for example, be 4,4'-dicyclohexylmethanediisocyanate, or isophorone diisocyanate, etc.

In certain embodiments, the polyurethane is formed of a composition including a combination of at least one polycarbonate polyol, as described in Formula I above, and one or more polyether polyols, as described in Formula II above. In certain embodiments, the polyurethane is formed of a composition including a combination of at least one polycarbonate polyol, as described in Formula I above, and one or more polyester polyols, as described in Formula III above. In yet another embodiment of the present invention, the polyurethane is formed of a composition including a combination one or more polyether polyols, as described in Formula II above, and one or more polyester polyols, as described in Formula III above.

Suitable chain extenders according to the present invention are, for example, diols with functionality of 2 having the Formula IV:

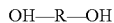

Wherein "R" is a linear or branched alkyl group such that molecular weight of the diol is approximately equal to 62 to 499 Daltons.

More particularly, the chain extender is a hydroxyl-terminated chain extender, for example, 1,3-propanediol, 1,4-butanediol, and 1,6-hexandiol. Alternatively, the hydroxyl-terminated chain extender is 1,4-butanediol.

Molecules of suitable crosslinking agents for the present invention contain more than 2 functional groups that react with either the hydroxyl group in the thermoplastic polyurethane or the isocyanate group in the isocyanate prepolymer. Preferred embodiments of such crosslinking agents are disclosed below.

One preferred embodiment of a crosslinking agent suitable for employing in the present invention is a multifunctional alcohol having not less than 3 alcohol functional groups. The alcohol functional groups react with isocyanate groups in the isocyanate prepolymer to form the urethane linkage and hence the three dimensional polymer molecule structure. Preferred embodiments include, but are not limited to, trimethyolpropane, trimethylolmethane, glycerin, pentaerythritol and di(trimethylolpropane).

Another preferred embodiment of a crosslinking agent suitable for employing in the present invention is an oligomer with more than two OH functional groups that can react with the isocyanate group in the isocyanate prepolymer. A preferred embodiment includes, but is not limited to, trimethylolpropane propoxylate with average $M_w$ of 308, as supplied by Sigma Aldrich.

Another preferred embodiment of a crosslinking agent suitable for employing in the present invention is a solution that has molecules with total amino and OH groups not less than two wherein these groups react with isocyanate groups of the prepolymer. Preferred embodiments include, but are not limited to, N,N-Bis(2-hydroxyethyl)isopropanolamine, N,N,N',N'-Tetrakis(2-Hydroxypropyl)ethylenediamine.

Another preferred embodiment of a crosslinking agent suitable for employing in the present invention includes multifunctional isocyanates, isocyanate oligomers and isocyanate prepolymers, each having at least 3 NCO groups that react with the hydroxyl group of the polyurethane. Preferred embodiments include, but are not limited to, Desmodur N75BA, Desmodur RFE, Desmodur RE supplied by Bayer Materials and Irodur E310 supplied by Huntsman.

Another preferred embodiment of a crosslinking agent suitable for employing in the present invention includes blocked isocyanates with not less than 3 isocyanate functional groups, those groups reacting with the hydroxyl groups of the polyurethanes. When unblocked, mostly by elevated temperature, the isocyanate groups react with the hydroxyl groups of the polyurethanes. Crosslinking agents with blocked isocyanates can be produced by reacting the multifunctional isocyanates with different blocking agents. Each blocking agent has a different de-blocking temperature, the temperature at which the dissociation reaction occurs that separates the blocking agent from the blocked isocyanate and provide the isocyanate functional group available for reaction. Examples of blocking agents are the oxime agent such as 3,5-dimethyl pyrazol, 2,6-dimethyl-4-heptanone oxime, methyl ethyl ketoxime, 2-heptanone oxime; 1,24-triazole; ε-caprolactam; and the alcohols such as nonylphenol, t-butanol, propylene glycol, isopropanol, methanol, n-butanol, n-propanol, n-hexanol, n-pentanol.

Examples of crosslinking agents suitable for employing in the present invention having blocked isocyanate groups include the polyether aromatic based polyurethane prepolymer Impranil product line supplied by Bayer Coating such as Impranil HS-62, Impranil HS-130 or the commercially available Duranate 17B-60PX, Duranate TPA-B80X, Duranate E402-B80T, Duranate MF-B60X manufactured by Asahi Kasei Chemicals Corporation.

Another preferred embodiment of a crosslinking agent suitable for employing in the present invention includes heat-activated urea compounds with not less than two urea functional groups, wherein the urea functional groups react with the hydroxyl groups of the polyurethane at high temperature through allophanate and biuret formation. Preferred embodiments of such heat-activated ureas include, but are not limited to, 3,3'-hexamethylenebis(1,1'-dipropylurea) and 3,3'-(4-methyl-1,3-phenylene)bis(1,1'-dipropylurea).

Another preferred embodiment of a crosslinking agent suitable for employing in the present invention includes (hydroxyalkyl)urea compounds with a single urea group and 2 hydroxyl groups, where the groups react with the isocyanate group of the prepolymer. Preferred embodiments include, but are not limited to, N,N-bis(2-hydroxyethyl) urea, tetrakis(2-hydroxylethyl)urea, tris(2-hydroxyethyl) urea, N, N'-bis(2-hydroxyethyl)urea, N, N'-bis(3-hydroxyethyl)urea, N,N'-bis(4-hydroxybutyl)urea and 2-urea-2-ethyl-1,3-propanediol.

Polyurethane primers suitable for use in the present invention include primers formed of compositions comprising at least one isocyanate-terminated polyurethane prepolymer and a hydroxyl-terminated chain extender and/or a hydroxyl-terminated crosslinking agent.

The isocyanate-terminated polyurethane prepolymer is formed, for example, of a composition including at least one diisocyanate selected, for example, from a group consisting of aliphatic diisocyanate and cycloaliphatic diisocyanate; and at least one polyol having the Formula I:

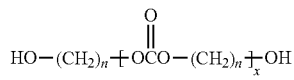

Wherein "n" is equal to an integer from 3 to 6 or a combination thereof and "x" is an integer that makes the molecular weight of the polyol approximately equal to 500 to 2500 Daltons.

The hydroxyl-terminated chain extender is, for example, a diol with functionality of 2 having the Formula IV:

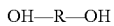

Wherein "R" is a linear or branched alkyl group such that molecular weight of the diol is approximately equal to 62 to 499 Daltons.

More particularly, the hydroxyl-terminated chain extender is, for example, 1,3-propanediol, 1,4-butandiol, and 1,6-hexanediol. Alternatively, the hydroxyl-terminated chain extender is 1,4-butandiol.

The hydroxyl-terminated crosslinking agent is, for example, a multifunctional alcohol having not less than 3 alcohol functional groups. The alcohol functional groups react with isocyanate groups in the isocyanate-terminated polyurethane prepolymer to form the urethane linkage and hence the three dimensional polymer molecule structure.

More particularly, the hydroxyl-terminated crosslinking agent is, for example but not necessarily limited to, trimethyolpropane, trimethylolmethane, glycerin, pentaerythritol and di(trimethylolpropane).

Alternative polyurethane primes suitable for use in the present invention include primers formed of composition comprising a hydroxyl-terminated polyurethane prepolymer and a isocyanate-terminated chain extender and/or a isocyanate-terminated crosslinking agent.

The hydroxyl-terminated polyurethane prepolymer is formed, for example, of a composition comprising at least one diisocyanate selected from a group consisting of aliphatic diisocyanate and cycloaliphatic diisocyanate; and at least one polyols having the Formula I:

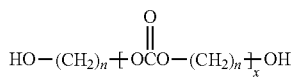

Wherein "n" is equal to an integer from 3 to 6 or a combination thereof and "x" is an integer that makes the molecular weight of the polyols approximately equal to 500 to 2500 Daltons.

The isocyanate-terminated chain extender, for example, an isocyanate prepolymer formed from a composition comprising a polycarbonate polyol and an aliphatic diisocyanate.

The isocyanate-terminated crosslinking agent includes, for example, multifunctional isocyanates, isocyanate oligomers and isocyanate prepolymers, each having at least 3 isocyanate functional groups that can react with the hydroxyl-terminated polyurethane prepolymer. More particularly, the isocyanate-terminated crosslinking agent is, for example but is not limited to, Desmodur N75BA, Desmodur RFE, Desmodur RE. Alternatively, the isocyanate-terminated crosslinking agent is Desmodur RFE.

The coated primer layer contain one or more reactive sites, e.g. —OH, —N=C=O functional groups, which can further react with the —N=C=O and —OH in photochromic polyurethane layer to form urethane chemical bondings. Besides these chemical bondings, the primer layer can also form one or more physical hydrogen bondings with the photochromic polyurethane layer through —OH, >C=O, —NH— functional groups in the two adjacent layers. By any of these bonding and combinations thereof, the primer layer serves to strengthen the adhesion between transparent resin sheets and the photochromic polyurethane layer or layers.

The primer layer is coated directly on to the resin layer with a solution comprising, for example, a polyurethane prepolymer, a chain extender, a crosslinking reagent and a solvent via die slot coating or gravure coating process. The solid content of the primer coating solution is in the range of 5-40 percent, with 10-30 percent being preferred. The final dried thickness of the primer layer is in the range of 0.1 to 30 micrometers, with 0.3-8 micrometers being preferred.

There are many materials that can be used to make transparent resin sheets so long as such a resin has a high transparency. When the photochromic polyurethane laminate of the present invention is used in a thermoplastic article such as a spectacle lens, the transparent resin sheets of the laminate are preferably comprised of a resin material that is thermally fusible to the article base material so that the photochromic laminate is tightly integrated with the article base when produced with the injection molding process. Thus, it is more preferred to have the same kind of material in both the article base and the transparent resin sheets.

Suitable transparent resin sheet materials include polycarbonate, polysulfone, cellulose acetate buturate (CAB), polyacrylate, polyester, polystyrene, copolymer of acrylate and styrene.

A polycarbonate-base transparent resin sheets is particularly preferred because of its high transparency, high tenacity, high thermal resistance, high refractive index, and most importantly its compatibility with the article base material when polycarbonate photochromic lenses are produced with the photochromic polyurethane laminate of the present invention by the injection molding process.

An exemplary polycarbonate based resin is polybisphenol-A carbonate. In addition, examples of polycarbonate based resin include homopolycarbonate such as 1,1'-dihroxydiphenyl-phenylmethylmethane, 1,1'-dihroxydiphenyl-diphenylmethane, 1,1'-dihydroxy-3,3'-dimethyl diphenyl-2,2-propane, their mutual copolymer polycarbonate and copolymer polycarbonate with bisphenol-A.

One preferred embodiment of the transparent resin sheet for use in making a cast photochromic lens is Celluloase Acylate film because of its high transparency, high thermal resistance, and more important, its similar refractive index and its compatibility to CR39 resin when CR39 photochromic lenses are produce with the photochromic polyurethane laminate of the present invention by the casting process.

Cellulose Acylate film (all or part of the hydroxyl groups at 2-, 3- and 6-positions of cellulose molecules are esterified with an acyl group). Acetyl group is a preferable substitution of the hydroxyl groups. Also an acyl group with two or more carbon atoms, substituting the hydroxyl group of cellulose may be an aliphatic group or an aryl group. Examples can be an alkylcarbonyl ester, and alkenylcarbonyl ester, an aromatic carbonyl ester or an aromatic alkylcarbonyl ester of cellulose.

Examples of cellulose acylate resin sheets are cellulose diacetate, and cellulose triacetate.

Suitable photochromic compounds in the context of the invention are organic compounds that, in solution state, are activated (darken) when exposed to a certain light energy (e.g., outdoor sunlight), and bleach to clear when the light energy is removed. They are selected from the group consisting essentially of benzopyrans, naphthopyrans, spirobenzopyrans, spironaphthopyrans, spirobenzoxzines, spironaphthoxazines, fulgides and fulgimides. Such photochromic compounds have been reported, for example, in U.S. Pat. Nos. 5,658,502, 5,702,645, 5,840,926, 6,096,246, 6,113,812, and 6,296,785; and U.S. patent application Ser. No. 10/038,350, all commonly assigned to the same assignee as the present invention and all incorporated herein by reference.

Among the photochromic compounds identified, naphthopyran derivatives are preferred for optical articles such as eyewear lenses. They exhibit good quantum efficiency for coloring, a good sensitivity and saturated optical density, an acceptable bleach or fade rate, and most importantly good fatigue behavior. These compounds are available to cover the visible light spectrum from 400 nm to 700 nm. Thus, it is possible to obtain a desired blended color, such as neutral gray or brown, by mixing two or more photochromic compounds having complementary colors under an activated state.

More preferred are naphtho[2,1b]pyrans and naphtho[1,2b]pyrans represented by the following generic formula:

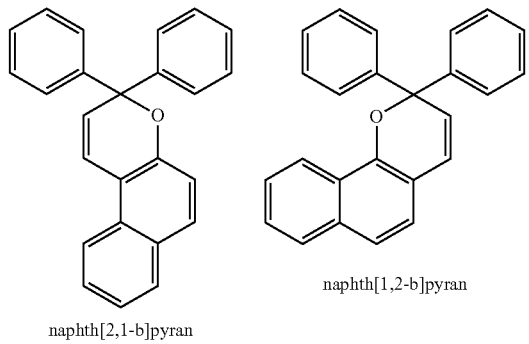 [SMILES: C1=CC(c2ccccc2)(c2ccccc2)Oc2ccc3ccccc3c21 ; C1=CC(c2ccccc2)(c2ccccc2)Oc2c1ccc1ccccc21]

naphth[2,1-b]pyran naphth[1,2-b]pyran

Substituents on various positions of the aromatic structure are used to tune the compounds to have desired color and fading rates, and improved fatigue behavior. For example, a photochromic dye may contain a polymerizable group such as a (meth)acryloyloxy group or a (meth)allyl group, so that it can be chemically bonded to the host material through polymerization.

The quantity of photochromic compound(s) incorporated into the polyurethane layer of the present invention is determined by the desired light blockage in the activated state and the thickness of the polyurethane layer itself. The preferred outdoor visible light transmission of sunglasses is preferably between 5% and 50%, between 8% and 30%, or between 10% and 20%. Preferably, the amount of total photochromic substance incorporated into the polyurethane layer may range from about 0.1 wt. % to about 5 wt. % of the total polyurethane or from about 0.5 wt. % to about 3.0 wt. %. If the thickness of the polyurethane layer is 100 micrometer, between about 0.5 wt. % to about 1 wt. % of photochromic compound(s) is needed to achieve an outdoor light transmission of between 10% and 20%. The amount of photochromic compound(s) needed is inversely proportional to the thickness of the polyurethane layer. In other words, to achieve the same outdoor light transmission the thicker the polyurethane layer, the lower the concentration of photochromic compound(s) needed. The concentration of the photochromic compound(s) also depends on the color intensity of the photochromic compound(s) at the activated state.

Photochromic polyurethane laminates according to certain embodiments of the present invention further employ various additives and/or non-photochromic dyes that function for adjustment of the tint. Additives such as antioxidants and light stabilizers are incorporated into the polyurethane layer in order to improve the fatigue resistance of the photochromic compounds. Hindered amines are usually used as light stabilizers, and hindered phenols are usually used as antioxidants. Preferred hindered amine light stabilizers include, bis(1,2,2,6,6-pentamethyl-4-piperidinyl)-sebacate, or a condensation product of 1,2,2,6,6-pentamethyl-4-piperidinol, tridodecyl alcohol and 1,2,3,4-butanetetra caboxylic acid as tertiary hindered amine compounds. Preferred phenol antioxidants include, 1,1,3-tris(2-methyl-4-hydroxy-5-t-butylphenyl)butane, tetrakis-[methylene-3-(3', 5'-di-t-butyl-4'-hydroxy-phenyl)propionate]meth- and, and 1,3,5-tris(3,5-di-t-butyl-4-hydroxybenzyl)-1,-3,5-triazine-2, 4,6-(-1H,3H,5H)-trione. Phenol antioxidants that contain 3 or more hindered phenols are preferable.

Another aspect of the present invention is the method of making a photochromic polyurethane laminate. In one embodiment, the process includes forming one or more prepolymers from a composition comprising one or more polyols and one or more diisocyanates. The one or more prepolymers may be formed together in a single reaction or separately in different reactions and subsequently combined to form a prepolymer mixture. For example, a single diisocyanate may be mixed with a single polyol to form a first prepolymer. The first prepolymer may, in turn, be combined with a second prepolymer formed from the same or a different diisocyanate and a second, different polyol. Alternatively, a composition comprising a diisocyanate may be combined with a mixture of different polyols.

A photochromic dye, a chain extender and/or a crosslinking agent are then mixed with the prepolymer thereby forming a photochromic polyurethane. The photochromic polyurethane is then cast on to a release liner layer or directly onto one of the transparent resin sheets to form a photochromic polyurethane layer. In the case of the formation of the photochromic polyurethane layer on the release liner, the photochromic polyurethane layer is then removed from the liner and laminated to one or between two transparent resin layers or sheets employing a primer coating on a the side proximate the side to be laminated to the photochromic polyurethane layer.

In the case of the formation of the photochromic polyurethane layer on the transparent sheet, the photochromic polyurethane and transparent sheet may thereby form the desired photochromic laminate or a second transparent sheet may be laminated to an opposite side of the photochromic polyurethane layer to thereby form the desired photochromic laminate.

Alternatively, the photochromic polyurethane may be extruded in a layer suitable for laminating between resin sheets. The photochromic polyurethane may also be extruded simultaneously along with one or two transparent resin layers in a multi-layer extrusion process so as to form a multi-layered photochromic laminate.

The photochromic polyurethane laminate thus formed according to the present invention is then cured. The curing is preferably performed in two stages: a) ambient temperature curing for one to 12 days, for example six days; and b) post curing at an elevated temperature of approximately 50 degrees Celsius to 130 degrees Celsius, for example 70 degrees Celsius, for eight hours to one week, for example four days.

Although the photochromic laminate according to the present invention is especially suitable for making photochromic polycarbonate lenses through the insert injection molding process described in commonly assigned U.S. Pat. No. 6,328,446, it can also be used as-is for other photochromic transparencies such as goggles and face shields. The photochromic laminate may also be incorporated into other type of eyewear lenses such as cast resin lenses with a process described in U.S. Pat. No. 5,286,419.

Specific preferred embodiments of the aforementioned inventive concepts are further discussed below.

Synthesis Example 1: Synthesis of
Hydroxyl-Terminated Polyurethane Resin Solution A one gallon stainless steel can was charged with 744.85 grams (0.7555 equivalents) of a polycarbonate diol having an OH number of 56.9 milligrams KOH per gram and a number average molecular weight of about 2000 grams per mole (available from Asahi Kasei as T5652). Tetrahydrofuran (THF 1150.5 grams) was then add to dissolve the diol, followed by adding 199.9 grams (1.511 equivalents) of 4,4'-dicyclohexylmethanediisocyanate (H12MDI, available from Bayer as Desmodur W) into the reactor at ambient temperature. The mixture was stirred until homogenous. Dibutyltin dilaurate catalyst (4.73 grams, available from Air Products as T-12 and diluted into 5 percent solution with THF) was added to the mixture to initiate the reaction. The mixture was shaken in a paint shaker for approximately five minutes. The stainless steel can container was purged with nitrogen, sealed and aged at room conditions for four days.

To the above solution was added 680.9 grams (0.7555 equivalents) of five percent solution of 1,4-butanediol in THF followed by the addition of 16.4 grams THF. The reaction solution was shaken in a paint shaker for five minutes and was allowed to grow the molecular weight by itself at room temperature. The molecular weight of the polymer solution was monitored by gel permeation chromatography. After three days of reaction at room temperature, the weight average molecular weight, $M_w$, was 90101 Daltons and the number average molecular weight, $M_n$, was 56906 Daltons (measured by Viscotek GPC system equipped with GPCmax VE2001 Solvent/Sample Module, 270-Dual RALS/LALS/Visc Detector and VE3580 RI Detector).

In order to quench the reaction, another portion of 1,4-butanediol (134.7 grams in five percent solution in THF, 0.1494 equivalents) was added to the above reaction solution which was further diluted with 354 grams THF.

Synthesis Example 2: Synthesis of
Isocyanate-Terminated Prepolymer Solution

A one gallon glass bottle was charged with 1121.59 grams (0.2821 equivalents) of a polycarbonate diol having an OH number of 141.1 milligrams KOH per gram and a number average molecular weight of about 800 grams per mole (available from Asahi Kasei as G3450J). Tetrahydrofuran (THF, 616.09 grams) was then added to dissolve the diol, followed by adding 752.94 grams (0.5691 equivalents) of 4,4'-dicyclohexylmethanediisocyanate (H12MDI, available from Bayer as Desmodur W) into the container at ambient temperature. The mixture was stirred until homogenous. Dibutyltin dilaurate catalyst (9.38 grams, available from Air Products as T-12 and diluted into five percent solution with THF) was added to the mixture to initiate the reaction. The mixture was stirred for about five minutes. The container was purged with nitrogen, sealed and aged at room conditions for four days.

Synthesis Example 3: Synthesis of
Isocyanate-Terminated Prepolymer Solution

A one gallon glass bottle was charged with 892.12 grams (0.2275 equivalents) of a polycarbonate diol having an OH number of 143.1 milligrams KOH per gram and a number average molecular weight of about 800 grams per mole (available from Asahi Kasei as T5650J). Tetrahydrofuran (THF, 492.88 grams) was then added to dissolve the diol, followed by adding 607.50 grams (0.4591 equivalents) of 4,4'-dicyclohexylmethanediisocyanate (H12MDI, available from Bayer as Desmodur W) into the container at ambient temperature. The mixture was stirred until homogenous. Dibutyltin dilaurate catalyst (7.50 grams, available from Air Products as T-12 and diluted into five percent solution with THF) was added to the mixture to initiate the reaction. The mixture was stirred for about five minutes. The container was purged with nitrogen, sealed and aged at room conditions for four days.

Synthesis Example 4: Synthesis of Hydroxyl-Terminated Polyurethane Resin Solution A 72 gallon glass reactor was charged with 23.46 pounds (10.77 equivalents) of a polycarbonate diol having an OH number of 56.8 milligrams KOH per gram and a number average molecular weight of about 2000 grams per mole (available from Asahi Kasei as T5652). Tetrahydrofuran (THF 24.16 pounds) was then added to dissolve the diol, followed by adding 6.24 pounds (2.15 equivalents) of 4,4'-dicyclohexylmethanediisocyanate (H12MDI, available from Bayer as Desmodur W) into the reactor at ambient temperature. The mixture was stirred until homogenous. Dibutyltin dilaurate catalyst (0.15 pounds, available from Air Products as T-12 and diluted into five percent solution with THF) was added to the mixture to initiate the reaction. The mixture was stirred at 50-53 degrees Celsius for about three hours.

To the above solution was added 10.33 pounds of THF, followed by 23.95 pounds of five percent solution of 1,4-butanediol (12.05 equivalents) in THF. The reaction solution was stirred at 45 degrees Celsius for two hours then discharged in a five gallon steel tight head container which was purged with nitrogen then sealed for storage. Samples were taken after ten days to measure the molecular weight of the solution by means of GPC (gel permeation chromatography). The weight average molecular weight was found to be 66210 Daltons and the number average molecular weight was 31939 Daltons (measured by Viscotek GPC system equipped with GPCmax VE2001 Solvent/Sample Module, 270-Dual RALS/LALS/Visc Detector and VE3580 RI Detector).

Synthesis Example 5: Synthesis of Hydroxyl-Terminated Polyurethane

Step 1: In a reactor flask, 1226.0 grams (9.27 equivalents) of 4,4'-dicyclohexylmethanediisocyanate (H12MDI, available from Bayer as Desmodur W) was charged into the reactor and stirred at ambient temperature. 2000 grams (4.02 equivalents) of a polycaprolactone diol having an OH number of 112 milligrams KOH per gram and a number average molecular weight of about 1000 grams per mole (available from Perstop as CAPA2101A) was preheated in an oven to 80 degrees Celsius and added to the reactor. The mixture was allowed to stir for about 15 minutes, before adding 16 grams of dibutyltin dilaurate catalyst (available from Air Products as T-12). The reaction flask was evacuated (less than 0.1 millimeter HG) and held at 90 degrees Celsius for six hours. An aliquot of the prepolymer was withdrawn and titrated for isocyanate content using standard n-butyl amine titration. The isocyanate content was found to be 6.75 percent (theory; 6.83 percent).

Step 2: 595.5 grams of isocyanate prepolymer prepared in Step 1 of Synthesis Example 5 was heated with stirring to 80 degrees Celsius and combined with 48.0 grams of 1,4-butane-diol while stirring. The mixture was stirred for 30 seconds and subsequently poured into a Teflon lined tray. The tray containing the casting was cured in an oven at 85 degrees Celsius for 24 hours. The thermoplastic polyurethane obtained had weight average molecular weight of 75,230 measured by GPC.

Synthesis Example 6: Synthesis of Isocyanate-Terminated Prepolymer

In a reactor flask, 335 grams (2.55 equivalents) of 4,4'-dicyclohexylmethanediisocyanate (available from Bayer as Desmodur W) was charged into the reactor and stirred at ambient temperature. 664.8 grams (1.33 equivalents) of a polycaprolactone diol having an OH number of 112 milligrams KOH per gram (available from Perstop as CAPA2101A was preheated in an oven to 80 degrees Celsius and added to the reactor. The mixture was allowed to stir for about 15 minutes, before adding 2.5 grams of dibutyltin dilaurate catalyst (available from Air Products as T-12). The reaction flask was evacuated (less than 0.1 millimeters HG) and held at 80 degrees Celsius for three hours and cooled down. The resulted product was titrated and resulted in NCO content of 5.10 percent.

Synthesis Example 7: Synthesis of Primer Polymer

In a reactor flask, 255 grams of 4,4'-dicyclohexylmethanediisocyanate (available from Bayer as Desmodur W) was charged into the reactor and stirred at ambient temperature. 545.6 grams of Duranol T-5650J having an OH number of 145.3 milligrams KOH per gram (available from Asahi Kasei Chemical) and 29.9 grams of 1,4-butanediol were added to the reactor. The mixture was allowed to stir for about 15 minutes, before adding 0.21 grams of dibutyltin dilaurate catalyst (available from Air Products as T-12). The mixture was stirred for 15 minutes and subsequently poured into a Teflon lined tray. The tray containing the casting was cured in an oven at 80 degrees Celsius for 24 hours. The thermoplastic polyurethane obtained had weight average molecular weight of 59,995 measured by GPC.

Synthesis Example 8: Primer Coated Film 382.0 grams of polymer produced in Synthesis Example 7 was dissolved into 1528 grams of anhydrous THF to make a solution of 20.0 percent solids. 625 grams of this resin solution, 500 grams of MIBK, methyl isobutyl ketone, and 382 grams of THF were combined into a container. The mixture was mixed well. 50.0 grams of Desmodur RFE (from Bayer Material Science LLC) was added into the solution and mixed well. The primer coating solution was then applied on a 15 mil thick Panlite 1151 film (available from Tejin Kasei American Co) with a slot die to a wet thickness of 0.3 mil. The coating was dried in an oven for 2 minutes at 120 degree Celsius.

In a similar manner as described immediately above, the coating solution was applied to a 12 mil thick Panlite 1151 film.

Comparative Laminate Example 9: Photochromic Laminate without Primer

The following materials were added into a five gallon container: 15.24 grams Tinuvin 144; 7.62 grams Irganox 1010; 166.36 grams of 2 percent Di-TMP in THF; 34.64 grams of photochromic dye; and 987.98 grams of anhydrous THF. The composition was mixed until all solids were dissolved. To the solution was added 2205.45 grams of the hydroxyl-terminated polyurethane solution prepared in Synthesis Example 1 and 1058.62 grams of the isocyanate-terminated prepolymer solution prepared in Synthesis Example 2. The composition was stirred at room temperature until homogenous solution was obtained then was allowed to stand to remove gas bubbles. The photochromic polyurethane solution was cast on release liner through a die slot to form a wet film. The solvent in the cast film was evaporated through a two-zone oven, in which first zone temperature is 185 degrees Fahrenheit, and second zone temperature is 295 degrees Fahrenheit. The drying time is 30 second in each zone. The dried film having a thickness of 1.65 mil was then laminated with a polycarbonate resin sheet of 15 mil thick with a roller laminator. The release liner was peeled off followed by further laminating the film with another polycarbonate resin sheet of 12 mil thick. After six days under ambient, the laminate was cured at 70 degree Celsius for four days.

Laminate Example 10: Primer Coated Film

In order to form the primer coating, the following materials were added into a four liter container: 1,4-butanediol (30.35 grams); Di-TMP (569 grams, two percent solution in THF); THF (974 grams); and water (1.1 grams). The mixture was stirred until homogenous. 954.5 grams of the isocyanate-terminated prepolymer solution prepared in Synthesis Example 3 was added and the mixture was stirred until homogenous.

The solution was directly casted through a die slot onto a polycarbonate resin sheet of 15 mil (or 12 mil) thick to form a primer layer film(s). The solvent in the cast film was evaporated in an oven at 265 degrees Fahrenheit for about 80 seconds. The dried primer layer had a thickness of 0.1 mil.

Laminate Example 11: Photochromic Laminate with Primer

The photochromic polyurethane solution was prepared and coated with the same process described in Comparative Laminate Example 9 and then laminated with a first primer coated polycarbonate resin sheet of 15 mil from Synthesis Example 10 and a second primer coated polycarbonate resin sheet of 12 mil from Synthesis Example 10. After six days under ambient, the laminate was cured at 70 degree Celsius for four days.

Laminate Example 12: Photochromic Laminate with Primer

Laminate Example 12 is identical to that described in Laminate Example 11 with the exception of the photochromic polyurethane solution that was employed.

The photochromic polyurethane solution employed in Laminate Example 12 was formed as follows. To a five gallon container the following components were added: 5.99 grams Tinuvin 144; 3.0 grams Irganox 1010; 65.04 grams of two percent Di-TMP in THF; 13.62 grams of photochromic dye; and 512.67 grams of anhydrous THF. The composition was mixed until all solids were dissolved. To the solution was added 743.27 grams of the hydroxyl-terminated polyurethane solution prepared in Synthesis Example 4 and 416.23 grams of the isocyanate-terminated prepolymer solution prepared in Synthesis Example 2. The composition was stirred at room temperature until a homogenous solution was obtained and then was allowed to stand to remove gas bubbles.

Laminate Example 13: Photochromic Laminate with Primer

A photochromic polyurethane solution was prepared by dissolving 252 grams of the thermoplastic polyurethane of Synthesis Example 5 into 775 grams THF at room temperature. 365 grams of the solution was added into a one gallon flask. To the solution was further added 4.2 grams of a photochromic gray dye; 1.8 grams of a UV stabilizer; 0.9 grams of an antioxidant; 0.4 grams of DiTMP; and 65 grams of THF. 79 grams of the isocyanate-terminated prepolymer from Synthesis Example 6 was then added into the flask. The mixture was stirred at room temperature for three hours before casting on an easy release liner (available from CP Films as T-50) with slot die targeting a 1.5 mil dry film thickness. The solvent in the cast film was evaporated at 180 degrees Fahrenheit for one minute and then 280 degrees Fahrenheit for one minute with airflow below the film. The dried film was transfer-laminated between the two resins sheets produced in Synthesis Example 8. After four days under ambient, the laminate was cured at 60 degree Celsius for four days.

Comparative Laminate Example 14: Photochromic Laminate without Primer

The photochromic polyurethane solution produced in Laminate Example 13 was used to make a laminate with same procedure as disclosed in Laminate Example 13 with the exception that the dried film was transfer-laminated between two sheets of polycarbonate that had not been coated or otherwise treated with a primer. The same curing conditions were used with four days at ambient conditions and then 60 degree Celsius for four days.

Test Procedures

The physical and material properties of the above-described examples were tested. The results of those tests are set forth in the table of FIG. 1. Test procedures used in obtaining the material property results set forth in the table of FIG. 1 are described below:

Room Temperature T-Peel Strength (Initial). T-Peel strength, i.e., the adhesion strength of the laminate, was measured on the samples on an Instron at speed of six inches per minute at room temperature. Strips of approximately one centimeter by seven centimeters of the laminate were punched out of the cast sheet with a hand punching press. For each strip of laminate, the edges of the resin sheet on either side of the photochromic polyurethane layer were pulled away from each other at room temperature at a pre-set rate of six inches per minute. The resulting measured value is the force per width of the laminate required to separate the two resin sheets at room temperature. A schematic drawing of the Room Temperature T-Peel Separation test is shown in FIG. 2.

Room Temperature T-Peel Strength (After Heat Treatment). As described above regarding Initial T-Peel Strength, the adhesion strength of the laminate was measured for the samples on an Instron at speed of six inches per minute at room temperature. However, prior to determining the adhesion strength of the laminates, the laminates were exposed to a temperature of 70 degree Celsius at 95 percent relative humidity for 168 hours. Following this exposure or treatment, for each strip of laminate, the edges of the resin sheet on either side of the photochromic polyurethane layer are pulled away from each other at room temperature at a pre-set rate of six inches per minute. The resulting measured value is the force per width of the laminate required to separate the two resin sheets at room temperature.

High Temperature T-Peel Strength (Initial). T-Peel strength, i.e., the adhesion strength of the laminate, was measured on the samples on an Instron at speed of six inches per minute at room temperature. Strips of approximately one centimeter by seven centimeters of the laminate were punched out of the cast sheet with a hand punching press. For each strip of laminate, edge of the two resin sheets on one side of the photochromic polyurethane layer were pulled away from each other by statically anchoring the edge of one resin sheet and hanging approximately 230 grams from the opposing resin sheet while the laminate was exposed to a temperature of approximately 130 degrees. If the sample laminate separated completely before ten minutes, the time to drop or complete separation was recorded. Separation lengths were then extrapolated to total tem minutes of the test.

High Temperature T-Peel Strength (After Heat Treatment). Conducted as described above regarding High Temperature T-Peel Strength (Initial), with the exception that the samples were first exposed to a temperature of 70 degree Celsius at 95 percent relative humidity for 168 hours.

Accelerated Weathering Test. Lenses were molded using the photochromic polyurethane laminate by an insert molding technique employing polycarbonate resin described in commonly assigned U.S. Pat. No. 6,328,466, the contests of which are herein incorporated by reference.

Six base D28 lenses blanks were surfaced to zero diopter and 3 millimeter thick lenses and were cut into a circular shape having a 60 millimeter diameter. Mechanical clamping force corresponding to a value of approximately 50 centiNewtons times the area of the lens was applied around the lens edge with a circular clamp. After applying a mixture of artificial skin oils and artificial perspiration, the lenses are placed into a temperature and humidity chamber at 65 degrees Celsius and 95 percent relative humidity, RH.

After the lenses were placed into a temperature and humidity chamber, they were inspected for delamination approximately every 24 hours. When inspected, the delamination is measured by its penetration width from the edge of the lens. When the width reaches 1 millimeter, the lens is deemed a failure. A lens is evaluated by the number of hours required to become a failure, referred to here as the time to failure.

In each trial, a group of lenses of approximately 12-18 lenses, made under similar conditions and with similar photochromic laminates were subjected to the weathering test described above. Time duration for 50 percent sample failures in each trial was recorded as the median life time of the lens group to illustrate the performance of the laminates.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A photochromic polyurethane laminate for use in an optical article comprising:
   a first resin sheet;
   a first primer layer coated on the first resin sheet;
   a second resin sheet;
   a second primer layer coated on the second resin sheet; and
   a photochromic polyurethane film having a first side attached to the first primer layer and a second side attached to the second primer layer, said photochromic polyurethane formed of a composition comprising:
   a hydroxyl-terminated polyurethane;
   an isocyanate-terminated polyurethane prepolymer; and
   at least one photochromic compound;
   the first and the second primer layers formed from a composition comprising an isocyanate-terminated polyurethane prepolymer that is the same as the isocyanate-terminated polyurethane prepolymer employed to form the photochromic polyurethane film.

2. The photochromic polyurethane laminate of claim 1 wherein said hydroxyl-terminated polyurethane is formed from a composition comprising:
   (a) at least one diisocyanate selected from a group consisting of aliphatic diisocyanate and cycloaliphatic diisocyanate; and
   (b) at least one polyol selected from a group consisting of:
      (i) a polycarbonate polyol having a Formula I:

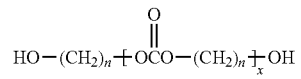

where n is equal to an integer from 3 to 6 or a combination thereof, and x is an integer that makes the molecular weight of the at least one polyol approximately equal to 500-2500 Daltons;
      (ii) a polyether polyol having a molecular weight approximately equal to 500-2500 Daltons; and
      (iii) a polyester polyol having a Formula III:

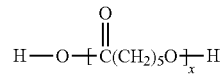

wherein x is an integer that makes the molecular weight of the at least one polyol approximately equal to 500-2500 Daltons.

3. The photochromic polyurethane laminate of claim 1 wherein said isocyanate-terminated polyurethane prepolymer is formed from a composition comprising:
   (a) at least one diisocyanate selected from a group consisting of aliphatic diisocyanate and cycloaliphatic diisocyanate; and
   (b) at least one polyol selected from a group consisting of:
      (i) a polycarbonate polyol having a Formula I:

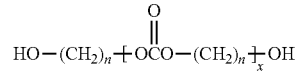

where n is equal to an integer from 3 to 6 or a combination thereof, and x is an integer that makes the molecular weight of the at least one polyol approximately equal to 500-2500 Daltons;
      (ii) a polyether polyol having a molecular weight approximately equal to 500-2500 Daltons; and
      (iii) a polyester polyol having a Formula III:

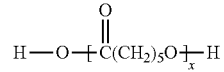

wherein x is an integer that makes the molecular weight of the at least one polyol approximately equal to 500-2500 Daltons.

4. The photochromic polyurethane laminate of claim 1 wherein the first and second primer layers are formed of a composition comprising an isocyanate-terminated polyurethane prepolymer having a molecular weight of about 59,995 Daltons.

5. The photochromic polyurethane laminate of claim 1 wherein said isocyanate-terminated polyurethane prepolymer employed in the first and second primer layers is formed of a composition comprising:
at least one diisocyanate selected from a group consisting of aliphatic diisocyanate and cycloaliphatic diisocyanate; and
a polyol comprising;

Formula I:

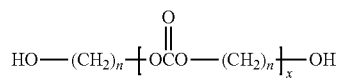

where n is equal to an integer from 3 to 6 or a combination thereof, and x is an integer that makes the molecular weight of the polyol approximately equal to 500-2500 Daltons.

6. The photochromic polyurethane laminate of claim 1 wherein the first and second primer layers have a thickness in a range of 0.3 to 8 micrometers.

7. The photochromic polyurethane laminate of claim 1 wherein the hydroxyl-terminated polyurethane has a molecular weight of about 66,210 Daltons.

8. The photochromic polyurethane laminate of claim 1 wherein said photochromic polyurethane laminate is cured within a temperature range from about 50 degrees Celsius to about 130 degrees Celsius.

9. A photochromic polyurethane laminate for use in an optical article comprising:
a photochromic polyurethane film interposed between two primer coated transparent resin sheets;
the photochromic polyurethane film formed of a composition comprising:
a hydroxyl-terminated polyurethane formed by reacting a first polyol with an aliphatic diisocyanate or a cycloaliphatic diisocyanate and a chain extender;
an isocyanate-terminated polyurethane prepolymer formed by reacting a second polyol with an aliphatic diisocyanate or a cycloaliphatic diisocyanate; and
at least one photochromic compound;
the primer of the two primer coated transparent resin sheets formed from a composition comprising an aliphatic diisocyanate or a cycloaliphatic diisocyanate and the same polyol employed for forming the isocyanate-terminated polyurethane prepolymer.

10. The photochromic polyurethane laminate of claim 9 wherein
the first polyol is selected from a group consisting of:
(i) a polycarbonate polyol having a Formula I:

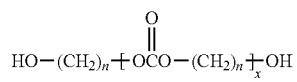

where n is equal to an integer from 3 to 6 or a combination thereof, and x is an integer that makes the molecular weight of the at least one polyol approximately equal to 500-2500 Daltons;
(ii) a polyether polyol having a molecular weight approximately equal to 500-2500 Daltons; and
(iii) a polyester polyol having a Formula III:

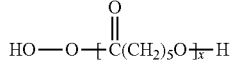

wherein x is an integer that makes the molecular weight of the at least one polyol approximately equal to 500-2500 Daltons.

11. The photochromic polyurethane laminate of claim 9 wherein
the second polyol is selected from a group consisting of:
(i) a polycarbonate polyol having a Formula I:

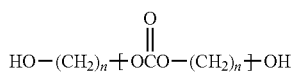

where n is equal to an integer from 3 to 6 or a combination thereof, and x is an integer that makes the molecular weight of at least one polyol approximately equal to 500-2500 Daltons;
(ii) a polyether polyol having a molecular weight approximately equal to 500-2500 Daltons; and
(iii) a polyester polyol having a Formula III:

wherein x is an integer that makes the molecular weight of the at least one polyol approximately equal to 500-2500 Daltons.

12. The photochromic polyurethane laminate of claim 9 wherein the primer is formed of a polyol comprising;

Formula I:

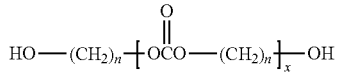

where n is equal to an integer from 3 to 6 or a combination thereof, and x is an integer that makes the molecular weight of the polyol approximately equal to 500-2500 Daltons.

13. The photochromic polyurethane laminate of claim 9 wherein said photochromic polyurethane laminate further comprises a molecular structure resulting from curing said laminate within a temperature range from about 50 degrees Celsius to about 130 degrees Celsius.

14. The photochromic polyurethane laminate of claim 9 wherein the hydroxyl-terminated polyurethane has a molecular weight of about 66,210 Daltons.

15. The photochromic polyurethane laminate of claim 9 wherein the primer of the two primer coated transparent resin sheets has a thickness in a range of 0.3 to 8 micrometers.

16. The photochromic polyurethane laminate of claim 9 wherein the isocyanate-terminated polyurethane prepolymer has a molecular weight of about 59,995 Daltons.

17. The photochromic polyurethane laminate of claim 1 wherein the first and the second primer layers are formed from a composition further comprising at least one component selected from a group consisting of a hydroxyl-terminated chain extender and a hydroxyl-terminated crosslinking agent.

* * * * *